Aug. 8, 1944.   F. CARTLIDGE   2,355,202
OVERLOAD RELEASE CLUTCH
Filed Feb. 8, 1943   2 Sheets-Sheet 2
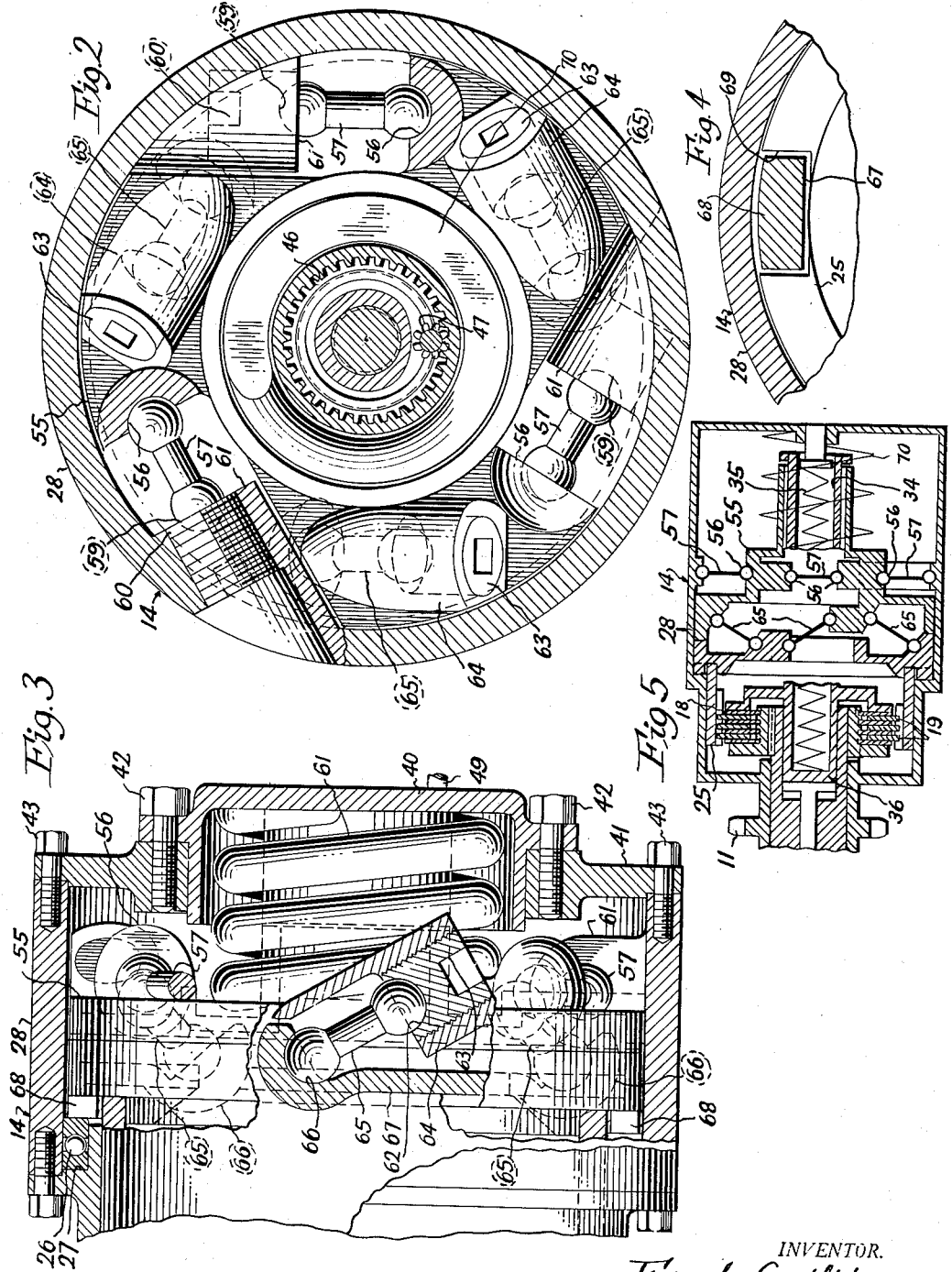
INVENTOR.
Frank Cartlidge
BY
Clarence F. Poole Patented Aug. 8, 1944

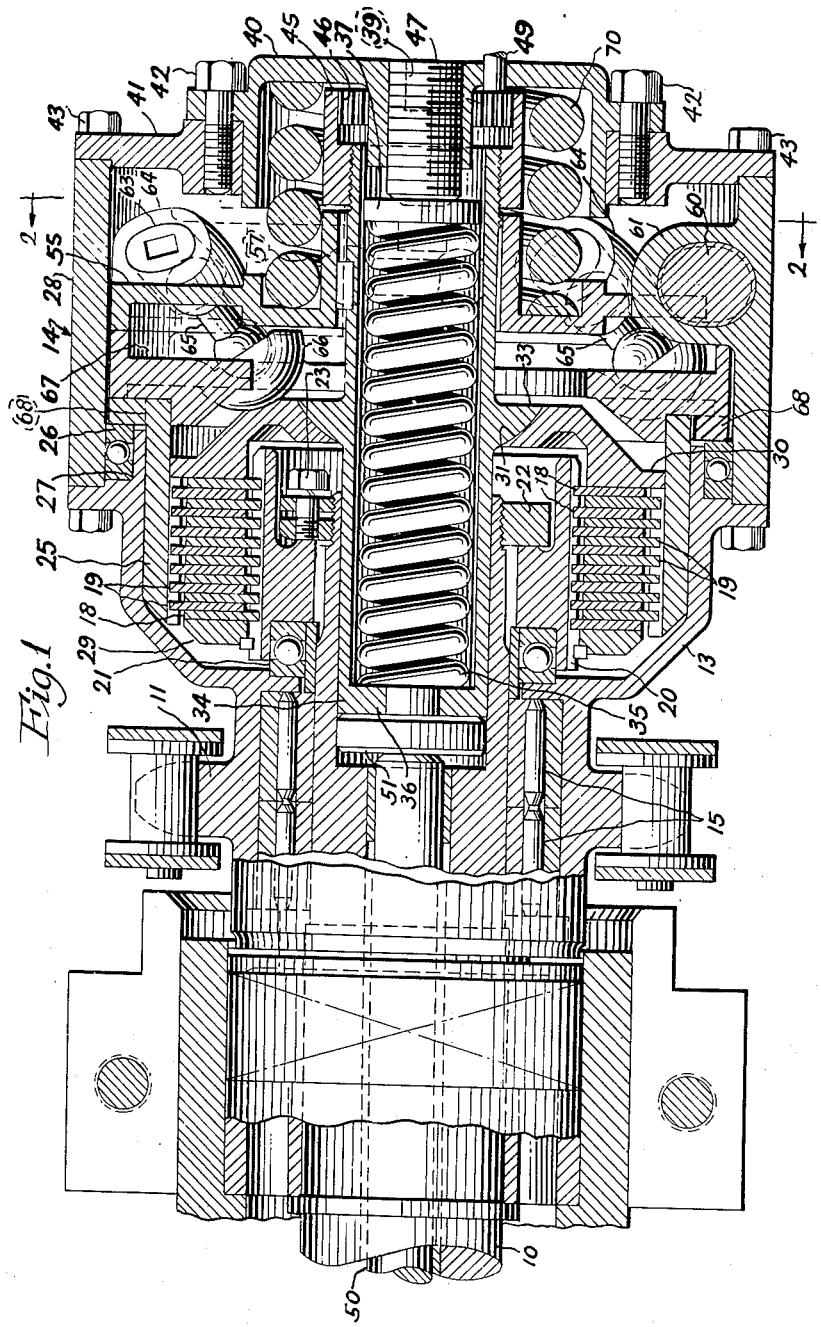

2,355,202

UNITED STATES PATENT OFFICE 2,355,202

OVERLOAD RELEASE CLUTCH

Frank Cartlidge, Chicago, Ill., assignor to Goodman Manufacturing Company, Chicago, Ill., a corporation of Illinois Application February 8, 1943, Serial No. 475,077

9 Claims. (Cl. 192—56)

This invention relates to improvements in overload release clutches and has as its principal objects to provide a novel form of overload release clutch arranged to automatically disconnect a driven member from a driving member upon predetermined overload conditions.

A more specific object of my invention is to provide an overload release clutch having a novel form of releasing mechanism so arranged as to reduce the frictional resistance present in former types of release clutches, to afford a more accurate determination as to the load when the clutch will release than formerly.

In carrying out my invention, I utilize a plurality of angularly disposed pivoted thrusting members reacting against a pre-loaded compression spring, to drive a clutch and to release the clutch when overload conditions are encountered, and arrange and construct these thrusting members to cut down frictional resistance to a minimum, to provide a more positive releasing device than formerly, which will accurately release the clutch at definite desired predetermined loads.

Other objects of my invention will appear from time to time as the following specification proceeds and with reference to the accompanying drawings wherein:

Figure 1 is a view in side elevation of an overload release clutch constructed in accordance with my invention, with certain parts broken away and certain other parts shown in longitudinal section;

Figure 2 is a transverse sectional view taken substantially along line 2—2 of Figure 1;

Figure 3 is a fragmentary side elevational view of the overload release clutch shown in Figure 1, with certain other parts broken away and shown in section than in Figure 1;

Figure 4 is an enlarged partial fragmentary transverse sectional view showing a detail of the drive to the friction clutch; and Figure 5 is a diagrammatic view, diagrammatically illustrating the overload release clutch shown in Figure 1.

Referring now to the drawings, the embodiment of my invention illustrated therein is shown as being incorporated in the drive for a shaft 10 from a coaxial sprocket 11. Said sprocket is herein shown as being formed integral with an end closure member 13 for a housing 14 of the overload release clutch and is journaled on its hub on the shaft 10 on suitable bearing means, herein shown as being roller bearings 15, 15.

The housing 14 encloses and forms a driving member for the overload release of my invention.

The clutching means of said overload release may be of any well known form, but is herein shown as being a multiple disk type of friction clutch including a plurality of alternately arranged abutting annular friction disks 18 and 19.

The disks 18, 18 are internally splined and are mounted on the splines of a splined member 20, which is splined on the inner end of the shaft 10. A radial thrust bearing 21 is recessed in and abuts the end of said splined member adjacent the sprocket 11. The opposite end of said splined member is abutted by a nut 22 threaded on the inner end of said shaft, to secure said splined member to said shaft. Said nut is locked in place by a machine screw 23 threaded through a split portion thereof.

The friction disks 19, 19, interposed between the friction disks 18, 18, are externally splined and have engagement with an internally splined member 25 mounted within a cylindrical portion of the end closure member 13, for free rotation with respect thereto. Said internally splined member has a flanged inner portion which projects outwardly therefrom and abuts a radial thrust bearing 26, mounted in a shouldered portion 27 of said end closure member 13, and retained therein by the inner periphery of a cylindrical portion 28 of the housing 14.

An annular abutment member 29 encircles and is secured to the end of the splined member 20 adjacent the sprocket 11 and abuts an end disk 18 of the friction clutch and forms a reaction means for said clutch. An engaging member 30 abuts the opposite end disk 18. Said engaging member is of an annular formation, extending towards the center of rotation of said splined member, and has a recessed socket portion 31, which is of an annular concave formation. The socket of said socket portion is adapted to be engaged by a convex engaging face of a flange 33, herein shown as projecting from and being formed integral with a cylindrical member 34. Said cylindrical member forms an enclosure for a compression spring 35 and is slidably mounted within the inner end of the shaft 10. Said compression spring has engagement with a closed end 36 of said cylindrical member, to urge said cylindrical member in a direction towards the sprocket 11, to engage the disks 18, 18 and 19, 19 with each other, to drive the shaft 10 from the member 25. The end of said compression spring opposite from said closed end of said cylinder abuts one side of an engaging plate 37. The opposite side of said engaging plate abuts a member 39 threaded in an end cap 40 of the housing 14 and forming a means for adjusting said compression spring. Said end cap extends within and is secured to the open portion of an annular end plate 41 by means of cap screws 42, 42. Said annular plate in turn is secured to the end of the cylindrical portion 28 of the housing 14 opposite from the end closure member 13, by means of cap screws 43, 43.

Adjustment of the amount of movement of the cylinder 34 with respect to the shaft 10 in a direction to release the clutch, is controlled by a cylindrical nut 45, threaded on the end of said cylinder 34, and adapted to engage the inside of the end cap 40, when the clutch is in a fully released position. Gear teeth 46 are formed internally of the outer end of said cylindrical nut. Said teeth are adapted to be meshed with a pinion 47 on the end of a shaft 49. Said shaft may have a squared end, for engagement with a key or crank, to form an accessible means for readily adjusting movement of the cylinder 34 and the clearance between the clutch disks when in a released position.

A clutch shifting rod 50 extends through the center of the shaft 10 and is journaled therein. The inner end of said shifting rod engages a plate 51, mounted on the outside of the closed end of the cylinder 34. When said shifting rod is moved in a direction which in Figure 1 is shown as being towards the right, the spring 35 will be compressed to disengage the disks 18 and 19 and release the clutch.

Referring now in particular to the novel form of drive connection from the housing 14 to the splined driving member 25 of the clutch, which is so arranged as to move the cylinder 34 against the spring 35 when overload conditions are reached, to release the clutch, a drive member 55 is feather keyed on its hub to the cylinder 34, adjacent the inner end of the cylindrical nut 45. Said drive member, as herein shown, is provided with a plurality of ball-shaped sockets 56, 56, adapted to receive ball-shaped ends of radially spaced thrusting drive members 57, 57 extending tangentially of the direction of rotation of said drive member. The opposite ends of said thrusting drive members are also ball-shaped and are adapted to extend within corresponding ball-shaped sockets 59, 59, formed within plugs 60, 60, threaded in bosses 61, 61 extending inwardly of the cylindrical portion 28 of the housing 14, and formed integrally therewith (see Figure 3). Rotation of said housing will thus cause rotation of said drive member 55 through the thrusting drive members 57, 57, and said members being pivotally mounted in ball-shaped sockets at their opposite ends, may pivot about said sockets to permit rectilinear movement of said member along the cylinder 34.

The drive member 55 is provided with a plurality of angularly disposed semi-ball-shaped sockets 62, 62 facing in a direction opposite from the sockets 59, 59. Said sockets are formed in the inner ends of plugs 63, 63 threaded in angularly disposed bosses 64, 64, formed integrally with the drive member 55, and alternately face in angular directions towards and away from the cylinder 34 (see Figures 2 and 5). Each of said sockets is adapted to receive a ball-shaped end of an angularly disposed thrusting drive member 65. The opposite ball-shaped end of each of said thrusting drive members is adapted to be received in a ball-shaped socket 66, formed integrally with an annular driven member 67 abutting the member 55 and forming a drive member for the splined member 25. Said last mentioned driven member abuts the flanged portion of said splined member 25 and is provided with a plurality of projecting jaws 68, 68 extending within slots 69, 69 formed in the periphery of the flange of said splined member, to form a driving connection to said splined member (see Figure 4).

A compression spring 70 encircles the hub of the drive member 55 and abuts an annular recessed portion of said drive member at one of its ends. The opposite end of said spring abuts the inside of the end cap 40 and is preloaded by said end cap to urge said drive member 55 in a direction towards the annular driven member 67 to cause said drive member to react against the angularly disposed thrusting drive members 65, 65.

In operation, the drive member 55 is driven from the housing 14 through the thrusting members 57, 57 acting in a direction substantially normal to the direction of rotation to said drive member, and the friction clutch is driven from said drive member 55 through the angularly disposed thrusting drive members 65, 65, yieldably engaged with the driven member 67 by the compression spring 70 and acting on said driven member 67 in angular directions, to impart rotational movement thereto, but to impart a force on said drive member 55 in a direction against said compression spring 70, to tend to move said drive member 55 to the right. As the load on the shaft 10 is increased beyond an amount determined by the force the spring 70 exerts against said drive member 55, said angularly disposed thrusting drive members will react against said drive member and compression spring, to move said drive member 55 against said spring towards the end cap 40, to first take up clearance between the end of the hub of said drive member and the inner end of said cylindrical nut 45 and then move the cylindrical member 34 against the spring 35, to release the disk clutch in the hereinbefore described manner. Upon the relief of said overload conditions, the spring 70 will move the drive member 55 towards the driven member 67 until it is disengaged from the cylindrical nut 45. At the same time the spring 35 will move the cylinder 34 and engaging member 30, to engage the clutch.

It may be seen from the foregoing that with the release mechanism just described all friction losses are reduced from those present in former types of overload release clutches, especially those utilizing helical and torsion spring releasing mechanisms, and that the release of the clutch is effected in a simplified manner by the thrusting action of the angularly disposed thrusting links acting against the preloaded compression spring 70.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an overload release clutch, a driven member, a friction clutch for driving said driven member, a driving member, a preloaded compression spring for urging said driving member in a direction towards said clutch, and angularly disposed thrusting means interposed between said driving member and said clutch, for driving said clutch and reacting against said spring, to release said clutch upon an overload on said driven member predetermined by said compression spring.

2. In an overload release clutch, a driving member, a driven member, a releasable friction clutch having driving connection with said driven member, a compression spring for holding said clutch in an engaged position, and a plurality of radially spaced angularly disposed thrusting members pivotally connected between said driving member and said clutch, for rotatably driving said clutch from said driving member, a preloaded compression spring acting to hold said thrusting members in driving engagement with said clutch, said thrusting members reacting against said preloaded spring and having operative connection with said first mentioned spring, to release said clutch upon overload thereof.

3. In an overload release clutch, a driven member, a releasable friction clutch having driving connection with said driven member, a driving member, a compression spring for holding said clutch in an engaged position, a plurality of radially spaced rotatably driven angularly disposed thrusting members interposed between said driving member and said clutch for rotatably driving said clutch from said driving member, a preloaded compression spring reacting against said angularly disposed thrusting members and adapted to be compressed by said thrusting members upon a load on said clutch determined by said preloaded spring, and a connection between said thrusting members and said first mentioned spring, to cause said thrusting members to compress said first mentioned spring and release said clutch upon a predetermined amount of movement against said preloaded spring.

4. In an overload release clutch, a driven member, a friction clutch for driving said driven member, a compression spring for holding said clutch in an engaged position, a driving member coaxial with the axis of rotation of said clutch, a driving connection from said driving member to said clutch including a plurality of angularly disposed thrusting members, and a preloaded compression spring for holding said thrusting members in engagement with said driving member and said clutch, said thrusting members being arranged to react against said driving member and rectilinearly move said driving member in a direction away from said clutch upon an overload on said clutch determined by said preloaded spring, and a connection between said driving member and said first mentioned spring, to cause said driving member to compress said first mentioned spring and release said clutch upon a predetermined amount of movement of said driving member against said preloaded spring.

5. In an overload release clutch, a driven member, a friction clutch having driving connection with said driven member, a driving member coaxial with the axis of rotation of said driven member and mounted for rectilinear movement in a direction along the axis of rotation of said clutch, means for driving said driving member including a plurality of radially spaced thrusting members extending substantially tangentially to the arc of rotation of said driving member and acting in the direction of rotation thereof, and a driving connection between said driving member and said friction clutch including a plurality of angularly disposed thrusting members arranged to urge said driving member in a direction away from said clutch and to move said driving member in such direction upon overload of said clutch, to release said clutch.

6. In an overload release clutch, a driven member, a friction clutch, a driving member coaxial with the axis of rotation of said clutch and mounted for rectilinear movement in a direction along the axis of rotation of said clutch, yieldable means for restraining rectilinear movement of said driving member, a plurality of radially spaced thrusting members extending substantially tangentially to the arc of rotation of said driving member and acting on said driving member in the direction of rotation thereof, for driving said driving member, and a drive connection between said driving member and said friction clutch including a plurality of angularly disposed thrusting members arranged to rotatably drive said clutch and react against said yieldable means in a direction away from said clutch to rectilinearly move said driving member against said yieldable means in a direction away from said clutch upon overload thereof, to release said clutch.

7. In an overload release clutch, a driven member, a friction clutch including an engaging member and a yieldable member acting on said engaging member, to hold said clutch in an engaged position, a driving member coaxial with the axis of rotation of said driven member and mounted for rectilinear movement in a direction along the axis of rotation of said clutch, yieldable means for urging said driving member towards said clutch, a plurality of radially spaced thrusting members extending substantially tangentially to the arc of rotation of said driving member and acting on said driving member in the direction of rotation thereof, for driving said driving member, and a drive connection between said driving member and said friction clutch including a plurality of angularly disposed thrusting members arranged to rotatably drive said clutch and react against said yieldable means in a direction away from said clutch, to rectilinearly move said driving member against said yieldable means in a direction away from said clutch upon overload thereof, and to move said engaging member against said first mentioned yieldable member, to release said clutch.

8. In an overload release clutch, a driven member, a friction clutch, a rotatably driven housing therefor, yieldable means for holding said clutch in an engaged position, and a drive connection between said housing and said clutch, arranged to positively release said clutch upon overload thereof, including a rotatable driving member disposed within said housing and mounted for rectilinear movement with respect thereto and having operative connection with said yieldable member, to release said clutch against said yieldable member, a plurality of radially spaced thrusting members pivotally connected between said housing and said rotatable member and extending tangentially to the direction of rotation thereof and acting on said driving member in the direction of rotation thereof, for driving said driving member from said housing, and a plurality of angularly disposed thrusting members pivotally connected between said driving member and said clutch and arranged to rotatably drive said clutch and react against said driving member in a direction away from said clutch, to rectilinearly move said driving member to release said clutch against said yieldable member upon a predetermined overload of said driven member.

9. In an overload release clutch, a driven member, a friction clutch, a rotatably driven housing therefor, a compression spring for holding said clutch in an engaged position, and a drive connection between said housing and said clutch, arranged to positively release said clutch upon overload thereof including a rotatable driving member disposed within said housing and mounted for rectilinear movement with respect thereto and having operative connection with said spring, to release said clutch against said spring, another compression spring, said second mentioned spring having engagement with said driving member and urging said driving member in a direction towards said clutch, a plurality of radially spaced thrusting members pivotally connected between said housing and said rotatable driving member, said thrusting members extending substantially tangentially to the direction of rotation of said driving member and acting on said driving member in the direction of rotation thereof, to rotatably drive said driving member from said housing, and a drive connection from said driving member to said friction clutch arranged to positively release said clutch upon a predetermined overload on said driven member and including a plurality of radially spaced angularly disposed thrusting members pivotally connected between said driving member and said clutch and arranged to rotatably drive said clutch and react against said driving member and said second mentioned spring, to first compress said second mentioned spring and then compress said first mentioned spring, to release said clutch upon an overload on said driven member determined by the force of said second mentioned spring.

FRANK CARTLIDGE.